(12) United States Patent
Li et al.

(10) Patent No.: US 8,391,030 B2
(45) Date of Patent: Mar. 5, 2013

(54) SWITCHING MODE POWER SUPPLIES AND ASSOCIATED METHODS OF CONTROL

(75) Inventors: En Li, Hangzhou (CN); Junming Zhang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 329 days.

(21) Appl. No.: 12/873,103

(22) Filed: Aug. 31, 2010

(65) Prior Publication Data

US 2011/0051470 A1   Mar. 3, 2011

(30) Foreign Application Priority Data

Sep. 1, 2009   (CN) .......................... 2009 1 0306436

(51) Int. Cl.
*H02M 3/335*   (2006.01)
(52) U.S. Cl. .................................. 363/21.18; 363/21.16
(58) Field of Classification Search ............... 363/21.16, 363/21.18, 21.11, 21.15, 131
See application file for complete search history.

(56) References Cited

U.S. PATENT DOCUMENTS 7,623,361 B2 *   11/2009   Basso et al. ..................... 363/49

\* cited by examiner

*Primary Examiner* — Shawn Riley
(74) *Attorney, Agent, or Firm* — Perkins Coie LLP (57) ABSTRACT

Switching mode power supplies and associated methods of control are disclosed herein. In one embodiment, a method for controlling a switching mode power supply includes determining whether the switching mode power supply is in a burst mode. If the switching mode power supply is in the burst mode, the method includes recording a switching time with and without switching pulses to obtain a current value of an equivalent frequency and generating a peak current limit that decreases as a load becomes lighter based on the equivalent frequency, thereby maintaining the equivalent frequency at the current value above an audible range. If the switching mode power supply is not in the burst mode, the method includes continuing to monitor whether the switching mode power supply is in the burst mode.

11 Claims, 5 Drawing Sheets

SWITCHING MODE POWER SUPPLIES AND ASSOCIATED METHODS OF CONTROL

CROSS-REFERENCE TO RELATED APPLICATION(S)

This application claims priority from Chinese Patent Application No. 200910306436.2, filed Sep. 1, 2009, which is incorporated herein by reference in its entirety.

TECHNICAL FIELD

The present disclosure relates generally to switching mode power supplies and associated methods of control.

BACKGROUND

Switching mode power supplies are used in various applications. Multi-mode control is widely adopted in switching mode power supplies because of the high conversion efficiency. Generally, the multi-mode control comprises a pulse skip mode, i.e., the so-called burst mode. However, if the switching mode power supply is under burst mode, the equivalent frequency becomes very low, which may generate audible noise if the equivalent frequency is lower than 20 kHZ. Thus there is a need to provide an improved switching mode power supply that can at least reduce or eliminate the audible noise under burst mode.

DETAILED DESCRIPTION

The present disclosure describes switch mode power supplies and associated methods of control. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the invention. Additionally, the invention can include other embodiments that are within the scope of the claims but are not described in detail with respect to FIGS. 1-5.

Figure 1:
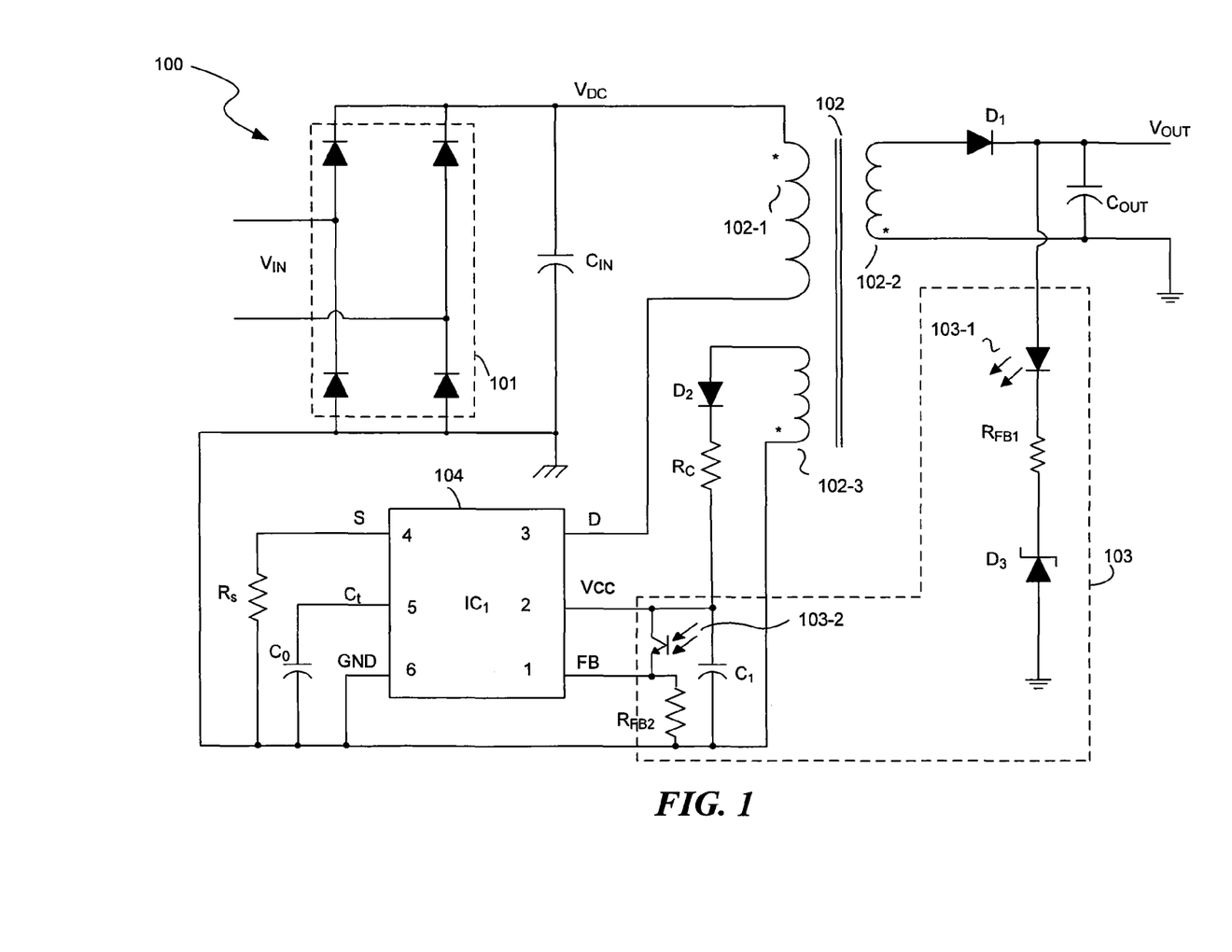
FIG. 1 is a schematic diagram of a switching mode power supply in accordance with several embodiments of the technology.

FIG. 1 is a schematic diagram of a switching mode power supply 100 in accordance with several embodiments of the technology. In one embodiment, the switching mode power supply 100 is configured as a flyback converter. The switching mode power supply 100 includes a rectifier bridge 101, a transformer 102, a feedback circuit 103, a controller 104, and a current sense resistor ($R_S$).

The transformer 102, in one embodiment, includes a primary winding 102-1, a main secondary winding 102-2, and an auxiliary secondary winding 102-3. In operation, the rectifier bridge 101 receives an AC input signal ($V_{IN}$), and converts it into a DC signal received by the primary winding 102-1 of the transformer 102. The transformer 102 is controlled by the controller 104 to generate DC output voltages on the secondary windings 102-2, 102-3 of the transformer 102. The controller 104 controls the current flow through the primary winding 102-1 of the transformer to effectively switch the transformer 102 on and off. The main secondary winding 102-2 provides a DC output voltage ($V_{OUT}$) at the output node via a first diode ($D_1$) and an output capacitor ($C_{OUT}$). The auxiliary secondary winding 102-3 provides a DC voltage source ($V_{CC}$) to supply the controller 104 via a second diode ($D_2$), a resistor ($R_C$) and a capacitor ($C_1$). Also illustrated in FIG. 1 is an input capacitor ($C_{IN}$) that stores and filters the DC input voltage.

The feedback circuit 103 generates a feedback signal ($V_{FB}$) that is inversely proportional to the output voltage ($V_{OUT}$) on the main secondary winding 102-2 of the transformer 102. In one embodiment, the feedback circuit 103 comprises an opto-coupler, a first feedback resistor ($R_{FB1}$), a Zener diode ($D_3$), and a second feedback resistor ($R_{FB2}$). As described in more detail below, the feedback signal is used by the controller 104 to control the switching frequency and the peak current of the switching regulator 100 as a function of the output voltage ($V_{OUT}$). The opto-coupler includes a photodiode 103-1 and a phototransistor 103-2. In operation, the intensity of the light emitted by the photodiode 103-1 is inversely proportional to the output voltage ($V_{OUT}$). As the intensity of the photodiode 103-1 increases, so does the current flowing through the phototransistor 103-2, which generates the feedback signal ($V_{FB}$) across the second feedback resistor ($R_{FB2}$). Therefore, the feedback signal ($V_{FB}$) is inversely proportional to the output voltage ($V_{OUT}$), i.e., it increases as the output voltage ($V_{OUT}$) becomes lower and decreases as the output voltage ($V_{OUT}$) becomes higher. It should be understood, however, that in other embodiments the feedback circuit 103 and controller 104 may be configured such that the feedback signal ($V_{FB}$) is proportional to the output voltage ($V_{OUT}$) or otherwise varies in relation to the output voltage ($V_{OUT}$).

The controller 104 includes a switching circuit that controls current flow through the primary winding 102-1 of the transformer 102. The power supplied to the output node may thus be controlled by varying the frequency at which the switching circuit switches the current through the primary winding 102-1 on and off. This is commonly referred to as the switching frequency of the transformer. The controller 104 further includes a frequency control circuit that controls the switching frequency as a function of the feedback signal ($V_{FB}$), which is inversely proportional to the output voltage ($V_{OUT}$) on the transformer's main secondary winding 102-2. In addition, the controller 104 includes a current limiting circuit that sets a peak current limit that may be proportional to the output voltage ($V_{OUT}$) by causing the switching circuit to suspend current flow through the primary winding 102-1 when the current reaches the peak current limit. In this way, both the switching frequency and the peak current limit may be regulated based on the output voltage ($V_{OUT}$) in order to improve system performance. For instance, the controller 104 may be configured to cause the switching frequency to decrease as the output voltage ($V_{OUT}$) becomes lower, and set the lowest switching frequency when the switching mode power supply enters burst mode. And the peak current limit may further decrease as the load becomes lighter when the switching mode power supply enters burst mode. The controller 104 may be further configured to set the peak current limit proportionally to the output voltage ($V_{OUT}$) so that a high efficiency at lighter loads and a high average efficiency is achieved and noises are eliminated in burst mode.

Figure 2:
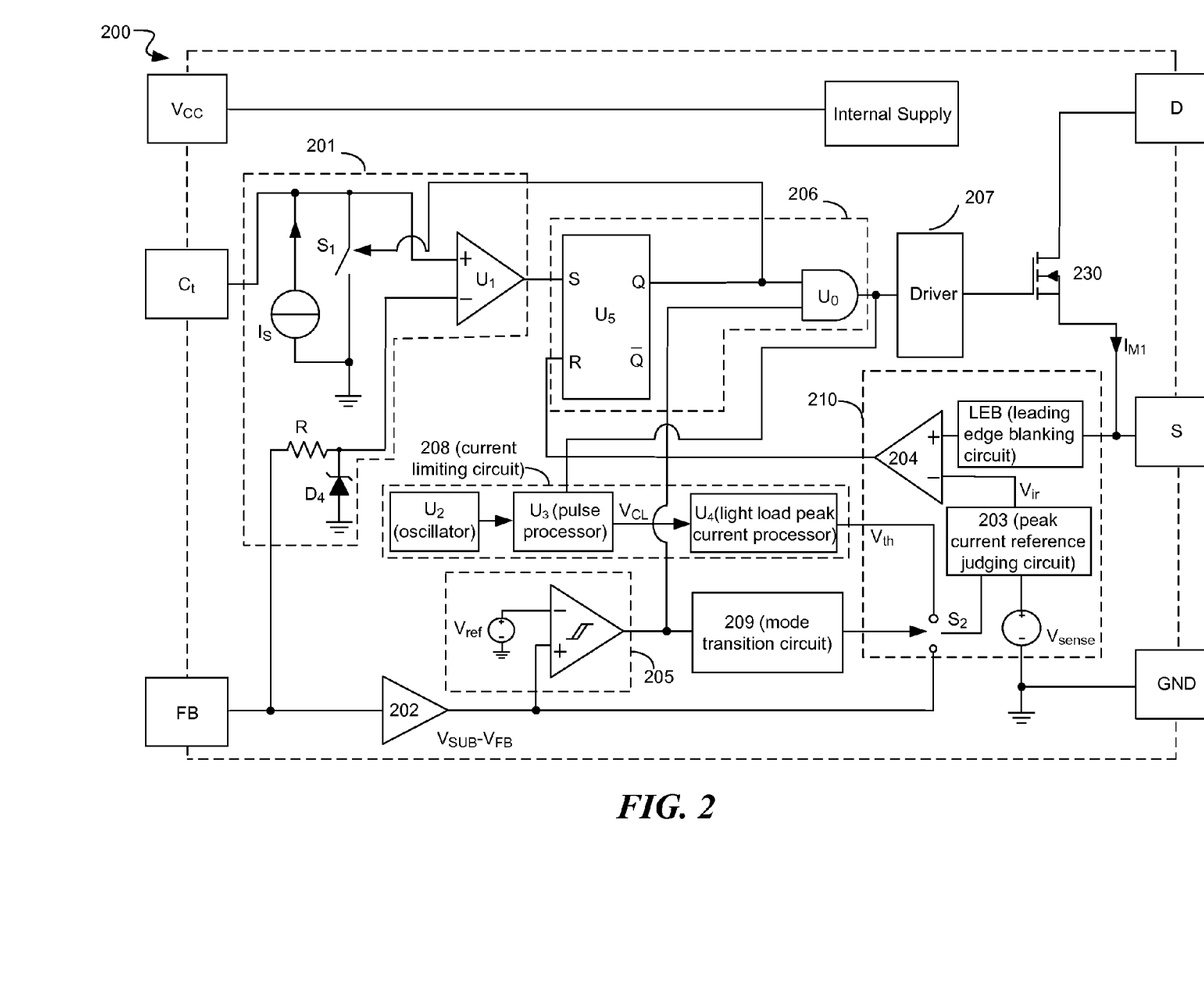
FIG. 2 is a schematic diagram of a controller suitable for use in the switching mode power supply of FIG. 1 in accordance with several embodiments of the technology.

FIG. 2 is a schematic diagram of a controller 200 suitable for use in the switching mode power supply 100 of FIG. 1 in accordance with several embodiments of the technology. The controller 200 includes a switching circuit 230 (e.g., a MOSFET switch); a frequency control circuit 201, a subtracter 202, a burst mode control circuit 205, a logical circuit 206, a driver 207, a mode transition circuit 209, and a current limiting circuit 208, 210.

In one embodiment, the frequency control circuit 201 includes a current source ($I_S$), an electronic switch ($S_1$), a comparator ($U_1$), a Zener diode ($D_4$), and a resistor (R). The frequency control circuit 201 also includes an external capacitor ($C_0$) shown in FIG. 1. The electronic switch ($S_1$) is controlled to be on and off by the logical circuit 206. When the electronic switch ($S_1$) is on, the voltage drop across the external capacitor ($C_0$) is reset to zero. When the electronic switch ($S_1$) is off, voltage drop across the external capacitor ($C_0$) increases because of the charge effect of the current source ($I_S$). When the voltage drop across the external capacitor ($C_0$) reaches the voltage at the inverting input terminal of the comparator ($U_1$), the comparator ($U_1$) outputs a high level signal to the logical circuit 206, which will provide a logic signal to turn on the electronic switch ($S_1$). Thus the voltage drop across the external capacitor is reset again.

In one embodiment, the burst mode control circuit 205 comprises a hysteresis comparator which receives a voltage reference ($V_{ref}$) at one input terminal and receives the output signal ($V_{SUB}-V_{FB}$) of the subtracter 202 at the other input terminal. The logical circuit 206 comprises a RS flip-flop ($U_5$), which receives the output signal of the frequency control circuit 201 at its set terminal (S), and receives the output signal of the current limiting circuit at its reset terminal (R). The logical circuit 206 further comprises an AND gate ($U_0$) which receives the output signal (Q) of the RS flip-flop at its first input terminal, and receives a burst mode signal provided by the burst mode control circuit 205 at its second input terminal.

In one embodiment, the current limiting circuit 208 includes an oscillator ($U_2$) which provides oscillation signals, a pulse processor ($U_3$), and a light load peak current processor ($U_4$). In one embodiment, the oscillator ($U_2$) provides oscillation signals only when the switching mode power supply enters burst mode. The pulse processor ($U_3$) receives the oscillation signals and the logical signal, and provides pulse processed signal ($V_{CL}$) based thereupon. The light load peak current processor ($U_4$) receives the pulse processed signal ($V_{CL}$), and provides a light load peak current processed signal ($V_{th}$) based thereupon. The current limiting circuit 210 includes a comparator 204, which is coupled to the switch circuit 230 via a leading edge blanking circuit (LEB); a peak current reference judging circuit 203, which receives a voltage reference ($V_{sense}$) in one input terminal, and receives the light load peak current processed signal ($V_{th}$) or the output signal ($V_{SUB}-V_{FB}$) of the subtracter 202 via a status switch ($S_2$) at the other input terminal, and provides a peak current limit ($V_{ir}$) based thereupon.

In one embodiment, the LEB circuit is a known circuit that reduces spikes in the signal by introducing a short delay. It should be understood, however, that in other embodiments there could be no LEB circuit. In one embodiment, the peak current reference judging circuit 203 compares the two input signals and selects the lower one to be its output signal, i.e., the peak current limit ($V_{ir}$). The mode transition circuit 209 receives the burst mode signal and provides a mode control signal to control the status switch ($S_2$) to be coupled to the output of the light load peak current processor ($U_4$) or to the output of the subtracter. In one embodiment, when the burst mode signal indicates that the switching mode power supply enters burst mode, the status switch ($S_2$) is controlled to be coupled to the output of the light load peak current processor ($U_4$); when the burst mode signal indicates that the switching mode power supply is not under burst mode, the status switch ($S_2$) is controlled to be coupled to the output of the subtracter.

Figure 3:
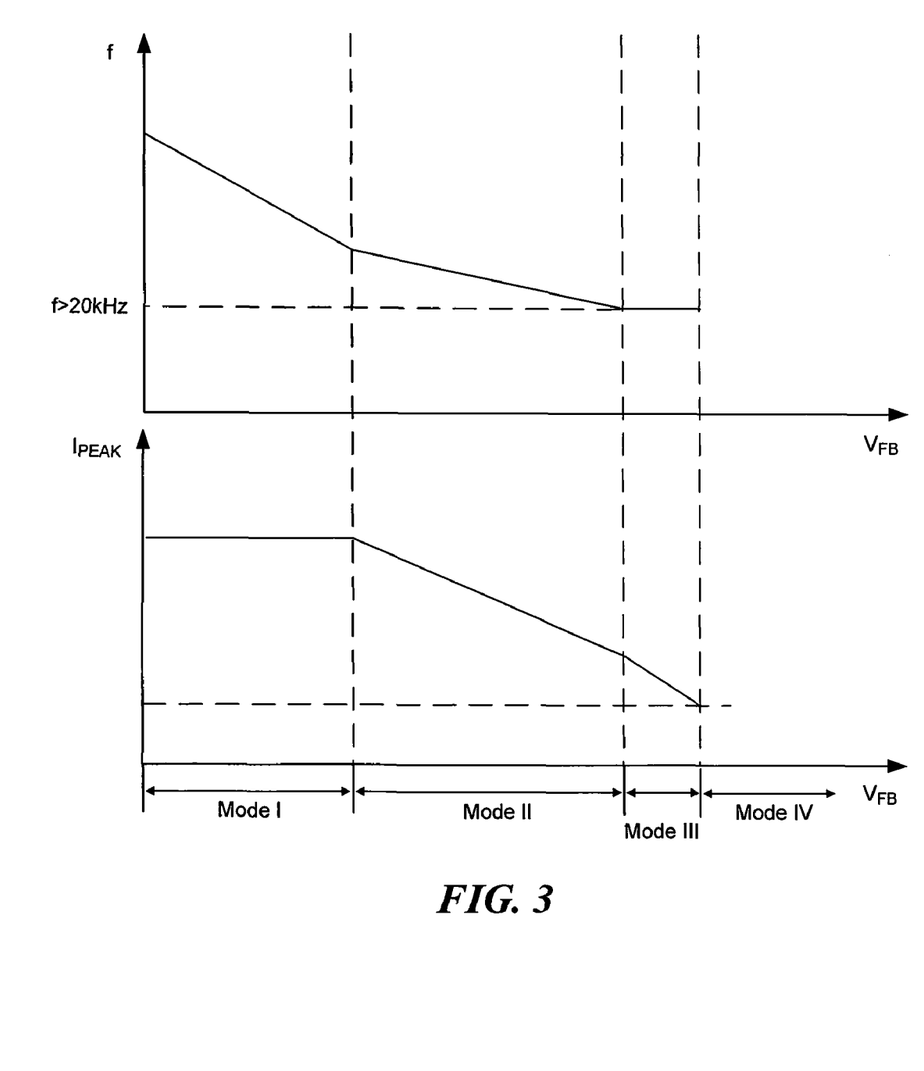
FIG. 3 is a graph illustrating an example of multi-mode operation of the controller in FIG. 2.

During operation of the switching mode power supply, if the load varies, i.e., the output voltage ($V_{OUT}$) varies, the feedback signal ($V_{FB}$) varies accordingly which is inversely proportional to the output voltage ($V_{OUT}$) as illustrated hereinbefore. As a result, when the load becomes lighter, the switching mode power supply will enter the following modes as depicted in FIG. 3:

(1): when the load is heavy, the feedback signal is low. The feedback signal increases as the load decreases. However, at first the feedback signal ($V_{FB}$) may be lower than the Zener diode ($D_4$) breakdown voltage ($V_{D4}$), and the output signal ($V_{SUB}-V_{FB}$) of the subtracter 202 may be higher than the voltage reference ($V_{sense}$) and the low limit ($V_{BRL}$) of the hysteresis comparator, i.e., $V_{FB}<V_{D4}$, $V_{SUB}-V_{FB}>V_{sense}$, $V_{SUB}-V_{FB}>V_{BRL}$. As a result, the burst mode control circuit 205 indicates that the switching mode power supply is not under burst mode.

On one hand, the status switch (S2) is controlled to be coupled to the output of the subtracter 202. Because VSUB−VFB>Vsense, the peak current reference judging circuit 203 selects the voltage reference (Vsense) as the peak current limit (Vir). Thus the peak current limit (Vir) is constant during this mode. On the other hand, the voltage at the inverting input terminal of the comparator (U1) of the frequency control circuit 201 is the feedback signal (VFB). So the switching frequency (fs) of the switching mode power supply is:

$$f_s = \frac{1}{T_{charge}} = \frac{1}{\frac{C_0 \times V_{FB}}{I_s}} = \frac{I_s}{C_0 \times V_{FB}}$$

As a result, the switching frequency ($f_s$) of the switching mode power supply decreases as the feedback signal ($V_{FB}$) increases, i.e., as the load becomes lighter. The switching mode power supply is under mode I when the switching frequency varies as a function of the feedback signal and the peak current limit is constant.

(2): the load continues to be lighter, so the feedback signal ($V_{FB}$) keeps increasing. When the output signal ($V_{SUB}-V_{FB}$) of the subtracter 202 is lower than the voltage sense ($V_{sense}$), but still higher than the low limit ($V_{BRL}$) of the hysteresis comparator, and the feedback signal ($V_{FB}$) is still lower than the Zener diode ($D_4$) break down voltage ($V_{D4}$), i.e., $V_{FB}<V_{D4}$, $V_{SUB}-V_{FB}<V_{sense}$, $V_{SUB}-V_{FB}>V_{BRL}$, the switching mode power supply enters mode II. The status switch ($S_2$) is still coupled to the output of the subtracter 202. In this mode, because the output signal ($V_{SUB}-V_{FB}$) of the subtracter 202 is lower than the voltage sense ($V_{sense}$), the peak current reference judging circuit 203 selects the output signal ($V_{SUB}-V_{FB}$) of the subtracter 202 as the peak current limit ($V_{ir}$). As a result, the peak current limit ($V_{ir}$) decreases as the load becomes lighter. The voltage at the inverting input terminal of the comparator ($U_1$) of the frequency control circuit 201 is still the feedback signal ($V_{FB}$). So the switching frequency ($f_s$) of the switching mode power supply also decreases as the load becomes lighter. That is, in mode II, both the switching frequency and the peak current limit vary as a function of the feedback signal.

(3): the load continues to be further lighter, the feedback signal ($V_{FB}$) keeps increasing. When the feedback signal ($V_{FB}$) goes higher than the Zener diode ($D_4$) break down voltage ($V_{D4}$), and the output signal ($V_{SUB}-V_{FB}$) of the subtracter 202 is lower than the voltage sense ($V_{sense}$), but still higher than the low limit ($V_{BRL}$) of the hysteresis comparator, i.e., $V_{FB}>V_{D4}$, $V_{SUB}-V_{FB}<V_{sense}$, $V_{SUB}-V_{FB}>V_{BRL}$, the switching mode power supply enters mode III. The status switch ($S_2$) is still coupled to the output of the subtracter 202 because $V_{SUB}-V_{FB}>V_{BRL}$. In this mode, because the output signal ($V_{SUB}-V_{FB}$) of the subtracter 202 is lower than the voltage sense ($V_{sense}$), the peak current reference judging circuit 203 selects the output signal ($V_{SUB}-V_{FB}$) of the subtracter 202 as the peak current limit ($V_{ir}$). As a result, the peak current limit ($V_{ir}$) decreases as the load becomes lighter. The voltage at the inverting input terminal of the comparator ($U_1$) of the frequency control circuit 201 changes to the Zener diode ($D_4$) break down voltage ($V_{D4}$). So the switching frequency ($f_s$) of the switching mode power supply is:

$$f_s = \frac{1}{T_{charge}} = \frac{1}{\frac{C_0 \times V_{D4}}{I_s}} = \frac{I_s}{C_0 \times V_{D4}}$$

As a result, the switching frequency ($f_s$) of the switching mode power supply keeps constant and the load becomes lighter during this mode. That is, in mode III, the peak current limit varies as a function of the feedback signal and the switching frequency is constant.

(4): the load continues to be further lighter, the feedback signal ($V_{FB}$) keeps increasing. When the feedback signal ($V_{FB}$) goes higher than the Zener diode ($D_4$) break down voltage ($V_{D4}$), and the output signal ($V_{SUB}-V_{FB}$) of the subtracter 202 is lower than the voltage sense ($V_{sense}$) and the low limit ($V_{BRL}$) of the hysteresis comparator, i.e., $V_{FB}>V_{D4}$, $V_{SUB}-V_{FB}<V_{sense}$, $V_{SUB}-V_{FB}<V_{BRL}$, the burst mode control circuit 205 indicates that the switching mode power supply enters burst mode. Accordingly, the status switch ($S_2$) is controlled to be coupled to the output of the light load peak current processor ($U_4$). During this mode, the lowest value of the switching frequency of the switching mode power supply is limited, and the peak current limit ($V_{ir}$) decreases as the load becomes lighter as described in more detail below.

Figure 4:
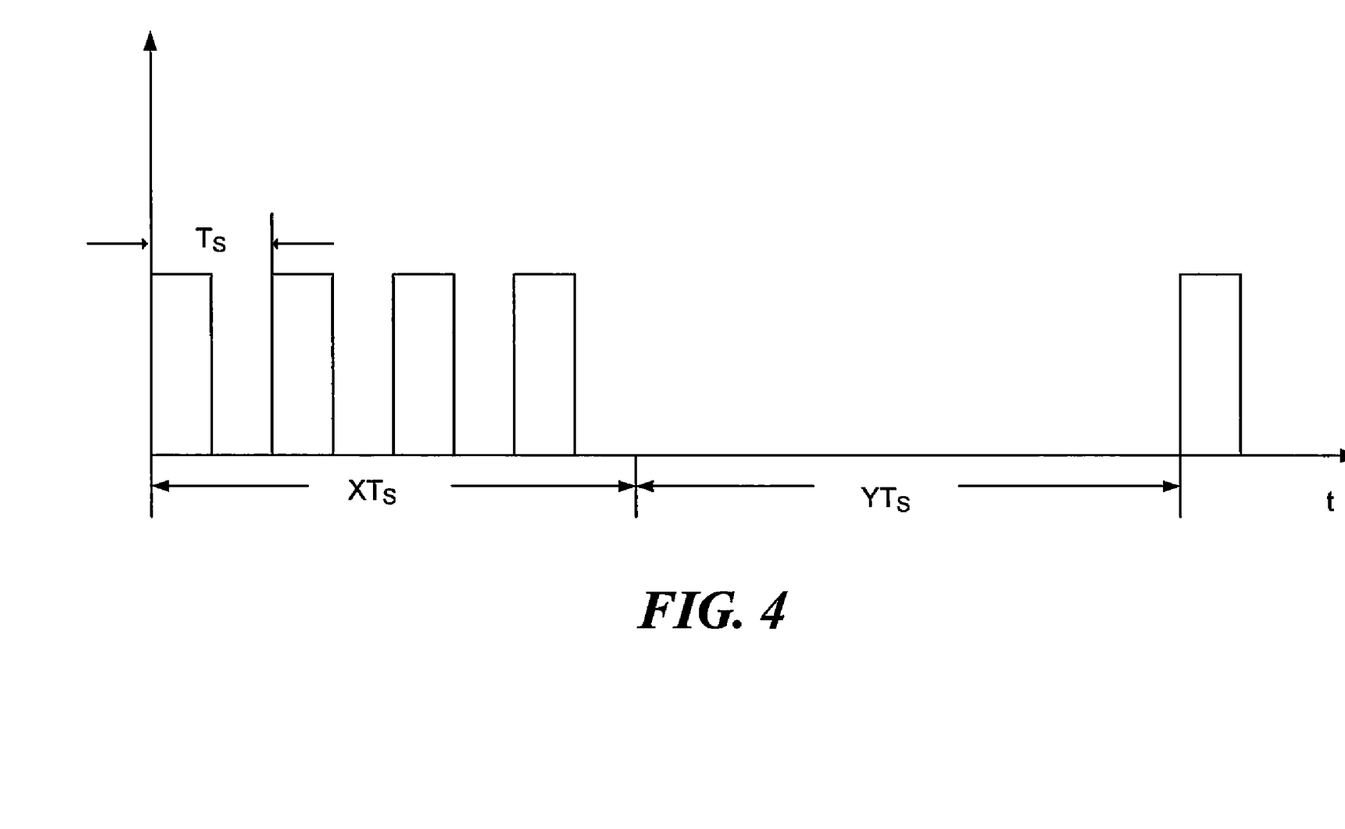
FIG. 4 shows a waveform of a switching signal used to control the switching circuit when the switching mode power supply in FIG. 2 is in burst mode.

FIG. 4 shows a waveform of the switching signal used to control the switching circuit 230 when the switching mode power supply in FIG. 2 is in burst mode. In FIG. 4, the y-axis represents the switching signal, and the x-axis represents time (t). In addition, Ts is the switching cycle of the switching mode power supply, X is the switching number when there is switching cycles, while Y is the switching number when there is no switching cycles. Thus, the equivalent frequency ($f_{eq}$) of the switching mode power supply is:

$$f_{eq} = \frac{X}{X+Y} \times \frac{1}{T_s}$$

For traditional burst mode control, X decreases and Y increases as the load becomes lighter. As a result, the equivalent frequency ($f_{eq}$) becomes lower as the load becomes lighter. When it falls into the audible frequency (i.e., 20 kHZ), noise is introduced. However, the embodiments in the technology can at least reduce or prevent the equivalent frequency ($f_{eq}$) from dropping into the audible range by further reducing the peak current limit when the switching mode power supply is in burst mode.

Specifically, when the switching mode power supply enters burst mode, the oscillator ($U_2$) outputs a series of instructions to the pulse processor ($U_3$), so that the pulse processor ($U_3$) starts to sense the switching signals, and record X and Y to get the equivalent frequency ($f_{eq}$). The pulse processor ($U_3$) further compares X, Y, and the equivalent frequency ($f_{eq}$) with preset $X_{set}$, $Y_{set}$, and $f_{eqset}$. In one embodiment, if the equivalent frequency $f_{eq}$ is lower than the preset frequency $f_{eqset}$, the pulse processed signal ($V_{CL}$) increases; if the equivalent frequency $f_{eq}$ is higher than the preset frequency $f_{eqset}$, the pulse processed signal ($V_{CL}$) decreases. The pulse processor ($U_3$) then provides the pulse processed signal ($V_{CL}$) to the light load peak current processor ($U_4$), so as to get the light load peak current processed signal ($V_{th}$) which varies inversely to the pulse processed signal ($V_{CL}$). By such regulation, X is regulated to the preset $X_{set}$, Y is regulated to the preset $Y_{set}$, and $f_{eq}$ is regulated to the preset $f_{eqset}$ when the load is rather light. The operation of the light load peak current processor ($U_4$) will be described in more detail below.

Figure 5:
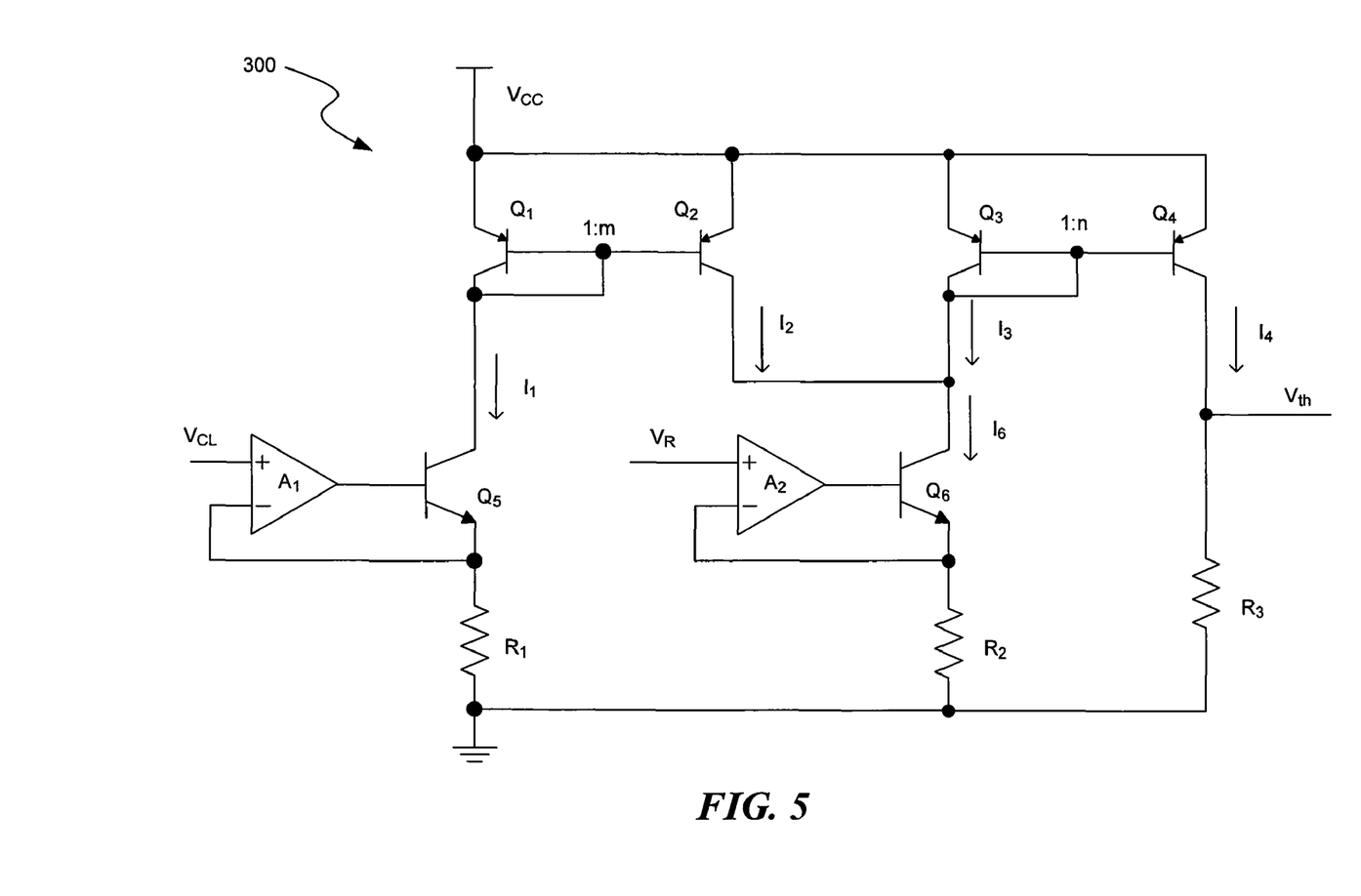
FIG. 5 shows an example of a light load peak current processor suitable for use in the controller of FIG. 2.

FIG. 5 depicts an example of a light load peak current processor 300 suitable for use in the controller 200 of FIG. 2. In one embodiment, the light load peak current processor 300 comprises a first amplifier ($A_1$), a second amplifier ($A_2$), six transistors ($Q_1 \sim Q_6$), and three resistors ($R_1 \sim R_3$). Wherein the first transistor ($Q_1$), the second transistor ($Q_2$), the third transistor ($Q_3$), and the fourth transistor ($Q_4$) are p-channel transistors; the fifth transistor ($Q_5$) and the sixth transistor ($Q_6$) are n-channel transistors. The non-inverting input terminal of the first amplifier (A1) is coupled to the pulse processed signal ($V_{CL}$), the inverting input terminal of the first amplifier ($A_1$) is coupled to the emitter of the fifth transistor ($Q_5$), and the output terminal of the first amplifier ($A_1$) is coupled to the base of the fifth transistor ($Q_5$). The first resistor ($R_1$) is coupled between the inverting input terminal of the first amplifier ($A_1$) and ground. That is, the first amplifier ($A_1$), the first resistor ($R_1$), and the fifth transistor ($Q_5$) form a voltage follower. The collector of the fifth transistor ($Q_5$) is coupled to the collector of the first transistor ($Q_1$). The first transistor ($Q_1$) and the second transistor ($Q_2$) form a first current mirror, wherein the current ratio of the current flow through the first transistor ($Q_1$) and the second transistor ($Q_2$) is 1:m.

The third transistor ($Q_3$) and the fourth transistor ($Q_4$) form a second current mirror, wherein the current ratio of the current flow through the third transistor ($Q_3$) and the fourth transistor ($Q_4$) is 1:n. The second amplifier ($A_2$), the sixth transistor ($Q_6$), and the second resistor ($R_2$) forms a second voltage follower. The non-inverting input terminal of the second amplifier ($A_2$) is coupled to a second voltage reference ($V_R$). The collector of the sixth transistor ($Q_6$) is coupled to the collectors of the second transistor ($Q_2$) and the third transistor ($Q_3$). The third resistor ($R_3$) is coupled between the collector of the fourth transistor ($Q_4$) and ground. The voltage drop across the third resistor ($R_3$) is the output signal of the light load peak current processor 300, i.e., it is the light load peak current processed signal ($V_{th}$).

As shown in FIG. 5, the current flow through the first transistor ($Q_1$) is equal to the current flow through the first resistor ($R_1$), i.e., $$I_1 = \frac{V_{CL}}{R_1} \quad (1)$$

The current flow through the sixth transistor ($Q_6$) is the sum of the current flow through the second transistor ($Q_2$) and the current flow through the third transistor ($Q_3$), i.e., $$I_6 = \frac{V_R}{R_2} = I_2 + I_3 \qquad (2)$$

And $$I_2 = m \times I_1 \qquad (3)$$

$$I_4 = n \times I_3 \qquad (4)$$

Then $$V_{th} = I_4 \times R_3 = n \times I_3 \times R_3 = n \times \left(\frac{V_R}{R_2} - m \times \frac{V_{CL}}{R_1}\right) \times R_3 \qquad (5)$$

If the resistance of the first resistor ($R_1$), the second resistor ($R_2$), and the third resistor ($R_3$) are same, i.e., $R_1=R_2=R_3$, and assume m=1, n=1, the equation (5) becomes:

$$V_{th}=V_R-V_{CL} \qquad (6)$$

From equation (6), it can be seen that the light load peak current processed signal ($V_{th}$) is inversely proportional to the pulse processed signal ($V_{CL}$). As illustrated hereinbefore, the pulse processed signal ($V_{CL}$) is inversely proportional to the equivalent frequency ($f_{eq}$). So the light load peak current processed signal ($V_{th}$) is proportional to the equivalent frequency ($f_{eq}$). If the equivalent frequency ($f_{eq}$) becomes lower, so does the light load peak current processed signal ($V_{th}$).

In addition, the light load peak current processed signal ($V_{th}$) is lower than the voltage reference ($V_{sense}$) at this time. So the peak current reference judging circuit 203 selects the light load peak current processed signal ($V_{th}$) as the peak current limit ($V_{ir}$). That is, the peak current limit of the switching mode power supply decreases as the load becomes further lighter. In this way, the equivalent frequency ($f_{eq}$) increases, which avoids audible noises. When the switching mode power supply exits burst mode, the status switch ($S_2$) is controlled to be coupled to the output of the subtracter 202 by the mode transition circuit 209. Then the switching mode power supply enters mode I, mode II, or mode III.

From the foregoing, it will be appreciated that specific embodiments of the disclosure have been described herein for purposes of illustration, but that various modifications may be made without deviating from the disclosure. For example, many of the members of one embodiment may be combined with other embodiments in addition to or in lieu of the members of the other embodiments. Accordingly, the disclosure is not limited except as by the appended claims.

We claim:

1. A switching mode power supply, comprising:
   a transformer having a primary winding and a secondary winding to supply power to a load;
   a feedback circuit that generates a feedback signal that varies in relation to the load on the secondary winding;
   a switching circuit coupled to the primary winding to control current flow through the primary winding; and
   a controller configured to control a switching frequency of the switching circuit and to limit a current flow through the primary winding by causing the switching circuit to suspend current flow through the primary winding when the current reaches a peak current limit that is set based on the feedback signal, wherein the switching frequency varies as a function of the feedback signal when the load is heavier than a predetermined level, and wherein the peak current limit becomes lower as the load becomes lighter when the switching regulator enters a burst mode.

2. The switching mode power supply of claim 1, wherein the controller comprises:
   a frequency control circuit configured to control the switching frequency of the switching circuit based on the feedback signal; and
   a current limiting circuit configured to limit the current flow through the primary winding to the peak current limit.

3. The switching mode power supply of claim 2, wherein the switching circuit further comprises:
   a burst mode control circuit configured to determine whether the switching mode power supply is in a burst mode, and to provide a burst mode signal based on the determination; and
   a logical circuit coupled to the frequency control circuit, the current limit circuit, and the burst mode control circuit, as the logical circuit being configured to provide a logical signal to control on/off of the switching circuit.

4. The switching mode power supply of claim 3, wherein the current limiting circuit comprises:
   an oscillator configured to provide oscillation signals;
   a pulse processor configured to provide a pulse processed signal based on the oscillation signals and the logical signal;
   a light load peak current processor configured to provide a light load peak current processed signal based on the pulse processed signal;
   a peak current reference judging circuit configured to receive a voltage reference at one input terminal, and receive the light load peak current processed signal or the feedback signal via a status switch at the other input terminal based on whether the switching mode power supply is in a burst mode, and provide a peak current limit based thereupon;
   a comparator coupled to the output of the peak current reference judging circuit and the switching circuit; and
   a status switch controlled by the burst mode signal.

5. The switching mode power supply of claim 4, wherein the light load peak current processor comprises:
   a first voltage follower configured to provide a first current signal based on the pulse processed signal;
   a first current mirror configured to provide a second current signal based on the first current signal;
   a second voltage follower configured to provide a sixth current signal based on the reference signal;
   a second current mirror configured to provide a fourth current signal based on the difference between the second current signal and the sixth current signal; and
   a resistor coupled to the second current mirror to obtain the light load peak current processed signal.

6. The switching mode power supply of claim 4, wherein the light load peak current processed signal is coupled to the peak current reference judging circuit if the switching mode power supply is in burst mode; and
   the feedback signal is coupled to the peak current reference judging circuit if the switching mode power supply is not in burst mode.

7. The switching mode power supply of claim 4, wherein the light load peak current processed signal becomes lower as the load becomes lighter.

8. The switching mode power supply of claim 4, wherein the peak current reference judging circuit is configured to compare the input signals, and select the lower signal as an output signal.

9. A method for controlling a switching mode power supply, comprising:
- determining whether the switching mode power supply is in a burst mode;
- if the switching mode power supply is in the burst mode:
  - recording a switching time with and without switching pulses to obtain a current value of an equivalent frequency;
  - generating a peak current limit that decreases as a load becomes lighter based on the equivalent frequency, thereby maintaining the equivalent frequency at the current value above an audible range; and
- if the switching mode power supply is not in the burst mode:
  - continuing to monitor whether the switching mode power supply is in the burst mode.

10. The method of claim 9, wherein generating the peak current limit further comprises:
- generating a pulse processed signal that is inversely proportional to the equivalent frequency;
- generating a light load peak current processed signal that is inversely proportional to the pulse processed signal; and
- generating the peak current limit based on the light load peak current processed signal.

11. The method of claim 9, wherein:
- if the equivalent frequency is lower than the preset value, the peak current limit increases; and
- if the equivalent frequency is higher than the preset value, the peak current limit decreases.

* * * * *